United States Patent
Watanabe et al.

(10) Patent No.: US 8,138,447 B2
(45) Date of Patent: Mar. 20, 2012

(54) LASER-ARC HYBRID WELDING HEAD

(75) Inventors: Masao Watanabe, Kobe (JP); Kenichi Fukami, Hagagun (JP); Keishi Setoda, Hagagun (JP)

(73) Assignees: Mitsubishi Heavy Industries, Ltd., Tokyo (JP); Honda Motor Co., Ltd., Tokyo (JP)

( * ) Notice: Subject to any disclaimer, the term of this patent is extended or adjusted under 35 U.S.C. 154(b) by 474 days.

(21) Appl. No.: 12/314,562

(22) Filed: Dec. 12, 2008

(65) Prior Publication Data

US 2009/0212028 A1 Aug. 27, 2009

(30) Foreign Application Priority Data

Feb. 25, 2008 (JP) ................................ 2008-042417

(51) Int. Cl.
*B23K 26/00* (2006.01)
(52) U.S. Cl. ............ 219/121.63; 219/121.64; 219/137.2
(58) Field of Classification Search ............. 219/121.63, 219/121.64, 121.77, 137.2, 121.76
See application file for complete search history.

(56) References Cited

U.S. PATENT DOCUMENTS 6,664,507 B2 * 12/2003 Akaba et al. ............... 219/130.5

FOREIGN PATENT DOCUMENTS

| JP | 2002-011585 | 1/2002 |
| JP | 2002-59286 | 2/2002 |

OTHER PUBLICATIONS

German Patent Office Action dated Dec. 1, 2009 in corresponding German Patent Application No. 10 2008 063 614.2 w/English translation.

* cited by examiner

*Primary Examiner* — M. Alexandra Elve
(74) *Attorney, Agent, or Firm* — Wenderoth, Lind & Ponack, L.L.P.

(57) ABSTRACT

A laser-arc hybrid welding head performs laser light irradiation and arc discharge of a base material to weld the base material by combined use of laser welding and arc welding. The welding head includes an optical fiber for transmitting laser light used in laser welding and an arc electrode for generating an arc between the arc electrode and the base material. The optical fiber is disposed such that an optical axis thereof crosses an axis of the arc electrode at a predetermined angle.

2 Claims, 1 Drawing Sheet

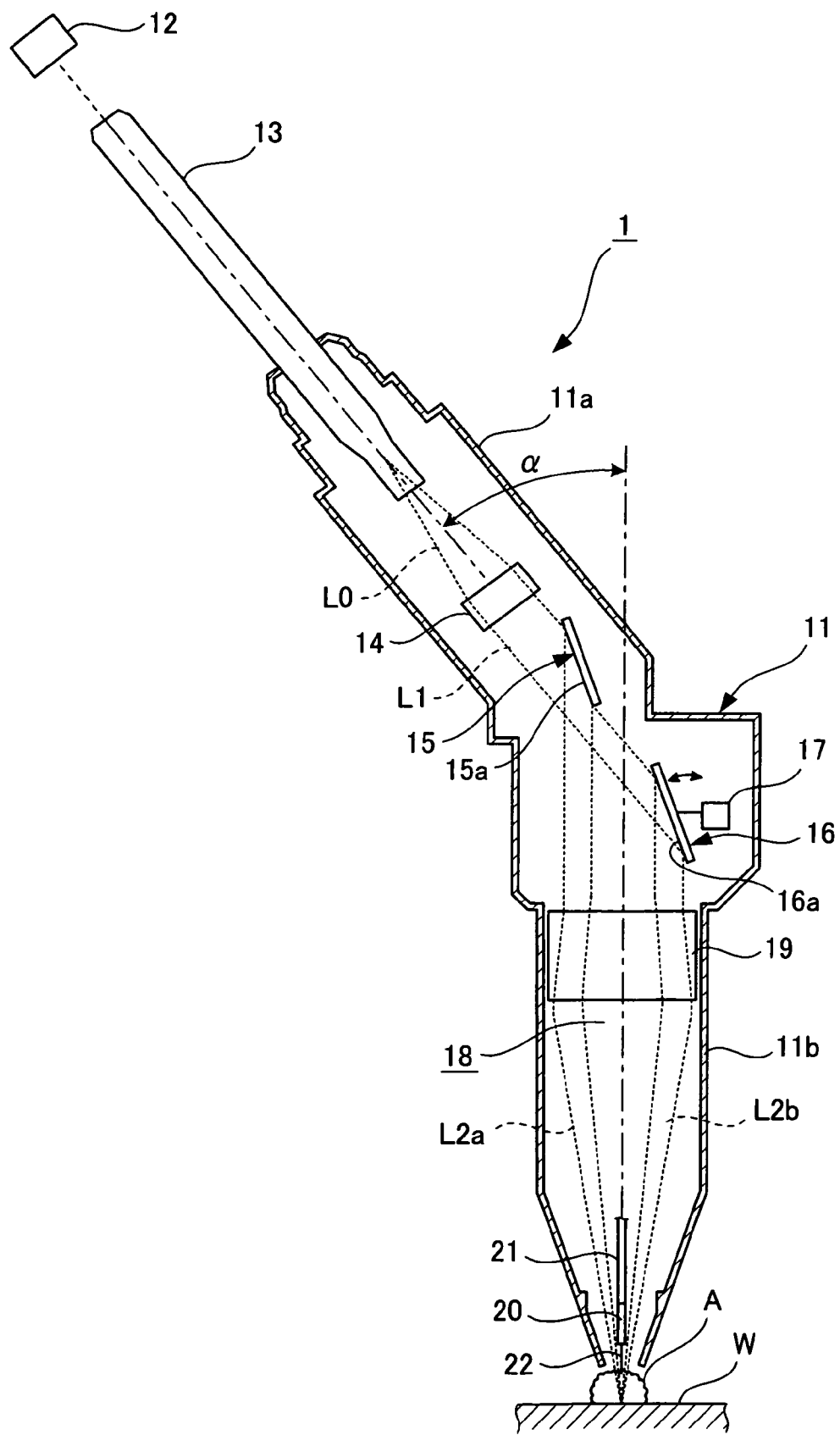

LASER-ARC HYBRID WELDING HEAD

BACKGROUND OF THE INVENTION

1. Field of the Invention

This invention relates to a laser-arc hybrid welding head which can weld a base metal material, as an object to be joined, by combined use of laser welding and arc welding.

2. Description of the Related Art

Laser welding and arc welding are available as types of welding technologies for joining a base metal material, which is an object to be joined. Of these technologies, the laser welding process performs welding by focusing laser light on one point of the base material with the use of optical instruments such as a lens and a mirror. According to this process, the density of energy is so high that high speed, low strain welding providing a great depth of penetration can be performed in a narrow fusion range.

The arc welding process generates an arc between the base material and a welding wire, or between the base material and an electrode, fuses the base material by the heat of the arc, and performs welding while protecting the periphery of a zone of the base material, which is to be welded, by a shielding gas. According to this process, the depth of penetration is small, but the arc spreads over a relatively wide range, so that beads become broad, and welding with a high groove tolerance can be performed.

As a concrete method of arc welding, GAM welding or MIG welding using a consumable electrode is carried out, with an arc being generated between a welding wire as the consumable electrode and the base material in an inert shielding gas atmosphere such as argon or helium. With TIG welding using a non-consumable electrode, on the other hand, welding is carried out, with an arc being generated between a tungsten electrode as the non-consumable electrode and the base material in the above-mentioned shielding gas atmosphere.

With the aforementioned laser welding process, however, since laser light is focused, a groove tolerance is low, thus requiring a strict working accuracy for the groove. With the above-mentioned arc welding process, if welding is performed at a high speed, the arc may be unstable, or the large amount of heat input may result in a great thermal strain.

In recent years, a hybrid welding process comprising a combination of laser welding and arc welding has been studied in an attempt to solve the drawbacks of both technologies. Combining laser welding and arc welding coaxially permits welding with a broad range of welding and a great depth of penetration. A laser-arc hybrid welding head enabling coaxial welding by laser welding and arc welding is disclosed, for example, in JP-A-2002-59286.

With the above-mentioned conventional laser-arc hybrid welding head, entry of laser light into a head body takes place via an optical fiber. The optical fiber has to be wired with a great curvature in order to maintain its ability to transmit laser light. Moreover, the focal length of laser light focused is determined by the performance of optical instruments. Thus, the leading end of the head cannot be brought closer to the base material than required. Under these situations, when the conventional laser-arc hybrid welding head is used, the head has to be positioned at or moved to an arbitrary position in consideration of a wiring space and the focal length as well as the size of the head body.

That is, if a welding operation is performed within a narrow space with the use of the conventional laser-arc hybrid welding head, for example, when a floor surface or the like within a vehicle body is welded on a vehicle production line, the head may contact surrounding members, because the head itself is formed with a large longitudinal dimension, and has extensive wiring and piping. To solve such problems, it is conceivable to downsize the lenses and mirrors which are constituents of the laser-arc hybrid welding head. This may deteriorate the welding performance or decrease the welding efficiency, and downsizing of the constituents has its limits.

The present invention has been accomplished as a solution to the above-described problems. It is an object of the invention to provide a laser-arc hybrid welding head which can perform welding, without contacting surrounding members, even when used within a narrow space.

SUMMARY OF THE INVENTION

A first aspect of the present invention is a laser-arc hybrid welding head for performing laser light irradiation and arc discharge of a base material to weld the base material by combined use of laser welding and arc welding, comprising:

an optical fiber for transmitting laser light used in laser welding; and an arc electrode for generating an arc between the arc electrode and the base material, wherein the optical fiber is disposed such that an optical axis thereof crosses an axis of the arc electrode at a predetermined angle.

In a second aspect of the present invention, the laser-arc hybrid welding head may further comprise: a collimating optical system for rendering parallel the laser light, which has been entered by the optical fiber, to deliver the laser light as parallel laser light; a splitting and deflecting optical system for splitting the parallel laser light, which has been delivered from the collimating optical system, into two split laser lights, and deflecting the two split laser lights to be parallel to each other and form the predetermined angle with an optical axis of the parallel laser light so that a space portion is formed between the split laser lights; and a focusing optical system for focusing the two split laser lights, which have been deflected by the splitting and deflecting optical system, on the base material, and the arc electrode may be disposed in the space portion to be closer to the base material than the focusing optical system.

In a third aspect of the present invention, the splitting and deflecting optical system may comprise: a first reflecting mirror for reflecting part of the parallel laser light, which has been delivered from the collimating optical system, thereby splitting the parallel laser light into the two split laser lights consisting of first split laser light which has been reflected, and second split laser light which has not been reflected; and a second reflecting mirror for reflecting the second split laser light, which has not been reflected by the first reflecting mirror, to deflect the second split laser light so that the second split laser light parallels the first split laser light and the space portion is formed between the second split laser light and the first split laser light.

The laser-arc hybrid welding head according to the present invention can deflect laser light efficiently, thereby performing welding, without contacting surrounding members, even when used within a narrow space.

BRIEF DESCRIPTION OF THE DRAWING

The present invention will become more fully understood from the detailed description given hereinbelow and the accompanying drawing which is given by way of illustration only, and thus is not limitative of the present invention, and wherein:

FIG. 1 is a schematic configurational drawing of a laser-arc hybrid welding head according to an embodiment of the present invention.

DETAILED DESCRIPTION OF THE INVENTION

A laser-arc hybrid welding head according to the present invention will be described in detail with reference to the accompanying drawing. FIG. 1 is a schematic configurational drawing of the laser-arc hybrid welding head according to an embodiment of the present invention.

As shown in FIG. 1, a laser-arc hybrid welding head 1 according to the present invention has a cylindrical head body 11 constituting a shell thereof. The head body 11 is crooked at its nearly intermediate part, and is composed of an inclined portion 11a on the proximal end side thereof, and a vertical portion 11b on the leading end side thereof, with the crooked region forming the boundary between them. The vertical portion 11b is disposed to have an axis orthogonal to the surface of a base material W, while the inclined portion 11a is disposed to have an axis crossing the axis of the vertical portion 11b at an angle of $\alpha$ (e.g., $\alpha=30°$).

To the proximal end of the inclined portion 11a, a YAG laser oscillator 12 is connected via an optical fiber 13. The YAG laser oscillator 12 oscillates laser light L0, and the oscillated laser light L0 is transmitted by the optical fiber 13 and entered to the proximal end side of the inclined portion 11a. The axis of the optical fiber 13 coincides with the optical axis of the laser light L0, and is placed coaxially with the axis of the inclined portion 11a.

A collimating lens group (collimating optical system) 14 is provided in a nearly intermediate part in the axial direction of the inclined portion 11a. The collimating lens group 14 is composed of a plurality of collimating lenses arranged in series, and allows the laser light L0 entered by the optical fiber 13 to pass there through, thereby delivering it as parallel laser light L1.

A first reflecting mirror 15 is provided on the leading end side of the inclined portion 11a, and a second reflecting mirror 16 is provided on the proximal end side of the vertical portion 11b. These reflecting mirrors 15 and 16 are placed with predetermined spacing in the axial direction of the inclined portion 11a, and placed with predetermined spacing in the axial direction of the vertical portion 11b. The reflecting mirrors 15 and 16 constitute a splitting and deflecting optical system.

The first reflecting mirror 15 is a flat mirror for reflecting laser light, and is inserted up to a nearly central part of a cross section of the parallel laser light L1, which has been outputted from the collimating lens group 14, in a direction orthogonal to the optical axis of the parallel laser light L1. The reflecting plane 15a of the first reflecting mirror 15 inclines downward. Thus, the first reflecting mirror 15 reflects an upper part of the parallel laser light L1 downwardly, thereby splitting the parallel laser light L1 into two parts, i.e., first split laser light L2a which has undergone reflection, and second split laser light L2b which has not undergone reflection. As a result, the first split laser light L2a is deflected to have an optical axis crossing the optical axis of the parallel laser light L1 at the angle of $\alpha$, whereas the second split laser light L2b proceeds, unchanged, in the direction of the optical axis of the parallel laser light L1.

The second reflecting mirror 16 is a flat mirror similar to the first reflecting mirror 15, and is disposed more remotely than the first reflecting mirror 15 from the collimating lens group 14 in the direction of the optical axis of the parallel laser light L1. The reflecting plane 16a of the second reflecting mirror 16 inclines downward so as to become parallel to the reflecting plane 15a of the first reflecting mirror 15. Thus, the second reflecting mirror 16 reflects the remaining lower part of the parallel laser light L1, which has not been reflected by the first reflecting mirror 15, downwardly as the second split laser light L2b. As a result, the second split laser light L2b is deflected to have an optical axis crossing the optical axis of the parallel laser light L1 at the angle of $\alpha$.

A mirror adjusting portion 17 is annexed to the second reflecting mirror 16, and the second reflecting mirror 16 is pivoted by adjusting the mirror adjusting portion 17. By so doing, the inclination angle of the reflecting plane 16a is changed to adjust the deflection (reflection) angle of the second split laser light L2b.

In this manner, the parallel laser light L1 is reflected and deflected downward by the reflecting mirrors 15 and 16 as the split laser lights L2a and L2b, whereby the optical axes of the split laser lights L2a and L2b become parallel. As a result, a space portion 18 is formed between the split laser lights L2a and L2b along their optical axes.

Furthermore, a focusing lens group (focusing optical system) 19 is provided in a nearly intermediate part in the axial direction of the vertical portion 11b. This focusing lens group 19 is composed of a plurality of focusing lenses arranged in series. The focusing lens group 19 allows the split laser lights L2a, L2b, which have been reflected and deflected by the reflecting mirrors 15, 16, to pass therethrough, thereby focusing and directing the split laser lights L2a, L2b toward a zone of the base material W to be welded. By so focusing the split laser lights L2a, L2b, laser welding can be performed.

Below the focusing lens group 19 in the space portion 18, an electrode head 20 is supported by the vertical portion 11b. To the electrode head 20, an arc welder and an electrode supply device (not shown) are connected via a guide pipe 21. Thus, an electric power and an inert gas are supplied from the arc welder, and an MIG (metallic inert gas welding) electrode (arc electrode) 22 is supplied from the electrode supply device to make arc (MIG) welding possible.

The MIG electrode 22 is supported by the electrode head 20 such that its axis crosses the axis of the optical fiber 13, namely, the optical axis of the laser light L0 at the angle of $\alpha$. Thus, the optical axes of the split laser lights L2a and L2b and the axis of the MIG electrode 22 are disposed coaxially. The irradiation with the split laser lights L2a, L2b and the generation of an arc A between the MIG electrode 22 and the base material W make it possible to carry out coaxial welding using laser welding and arc welding in combination.

According to the present embodiment, the MIG electrode 22, which is a consumable electrode, is used as the arc electrode, but a TIG (tungsten inert gas welding) electrode, which is anon-consumable electrode, may be used. In this case, the electrode supply device is unnecessary, and it suffices to hold the TIG electrode simply by the electrode head 20.

In the above-described configuration, therefore, the laser light L0 emitted by the YAG laser oscillator 12 is transmitted by the optical fiber 13 and directed toward the collimating lens group 14. The laser light L0 entered into the collimating lens group 14 is passed through its interior, and thereby delivered as the parallel laser light L1.

Then, part of the parallel laser light L1 issued from the collimating lens group 14 is reflected by the first reflecting mirror 15 to become the first split laser light L2a, which is deflected in a direction where it crosses the optical axis of the parallel laser light L1 at the angle of $\alpha$. On the other hand, the remaining part of the parallel laser light L1, which has not been reflected by the first reflecting mirror 15, becomes the second split laser light L2b. The second split laser light L2b proceeds, unchanged, in the same direction as the optical axis of the parallel laser light L1. Then, the second split laser light L2b is reflected by the second reflecting mirror 16, and is deflected in a direction in which it crosses the optical axis of the parallel laser light L1 at the angle of α.

As described above, the parallel laser light L1 is reflected and split in two by the reflecting mirrors 15, 16, and the resulting split laser lights L2a, L2b are deflected in a direction in which they cross the optical axis of the parallel laser light L1 at the angle of α. As a result, the first split laser light L2a and the second split laser light L2b proceed parallel. Moreover, the space portion 18 is formed between them along the directions of their optical axes.

After the split laser lights L2a and L2b proceeding parallel are directed toward the focusing lens group 19, they are focused by passing through its interior, and directed toward the zone of the base material W to be welded. Simultaneously, the electrode head 20 disposed in the space portion 18 is supplied with the electric power, inert gas and MIG electrode 22. Since the optical axes of the split laser lights L2a, L2b and the axis of the MIG electrode 22 are placed coaxially, irradiation with the split laser lights L2a, L2b and arc discharge to the base material W by the MIG electrode 22 can be performed coaxially. Thus, coaxial welding using a combination of laser welding and arc welding takes place.

In such coaxial welding, the irradiation with the split laser lights L2a, L2b evaporates the base material W, and a part of it is ionized (Fe ions, Cr ions, Ni ions, etc.), inducing an arc discharge. Even when the MIG electrode 22 moves at a high speed, therefore, the arc A stabilizes, thus forming continuous neat beads. Besides, the leading end of the MIG electrode 22 is heated not only by the heat of the arc discharge and Joule heat, but also by the irradiation with the split laser lights L2a, L2b. Consequently, welding can be performed at a high speed in comparison with MIG welding or TIG welding performed singly.

If, in the laser-arc hybrid welding head, an error in assembly or the like occurs to cause a discrepancy between the focal lengths of the split laser lights L2a and L2b, the mirror adjusting portion 17 is adjusted to change the angle of deflection by the reflecting plane 16a of the second reflecting mirror 16. By so doing, the focal length adjustment of a focused leading end part of the second split laser light L2b can be made. Thus, coaxial welding can be always performed with a desired focal length.

Thus, the optical fiber 13 is disposed such that its optical axis crosses the axis of the MIG electrode 22 at the angle α. The laser light L0 entered by the optical fiber 13 is converted into the parallel laser light L1. Then, the parallel laser light L1 is reflected by the reflecting mirrors 15, 16 as the split laser lights L2a, L2b. In this manner, the laser light L0 entered by the optical fiber 13 can be deflected efficiently. As a result, the inclined portion 11a crooked relative to the vertical portion 11b on the leading end side can be formed on the proximal end side of the laser-arc hybrid welding head 1. Thus, even if the laser-arc hybrid welding head 1 is positioned at or moved to an arbitrary position within a narrow space by a multi-axis NC robot or the like, it is capable of welding without contacting surrounding members, since it occupies a narrow space. Furthermore, there is no need for downsizing, such as using small lenses or mirrors as the constituents of the head. Thus, the deterioration of the welding performance or a decrease in the welding efficiency can be suppressed.

In addition, the present invention can be applied to a laser-arc hybrid welding head which can enhance welding properties by pivoting or moving the reflecting mirror to adjust the spacing between the focused leading end parts of the split laser lights.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laser-arc hybrid welding head for welding a base material with laser welding and arc welding, the laser-arc hybrid welding head comprising:
    an arc electrode for generating an arc between the arc electrode and the base material;
    an optical fiber for transmitting laser light used in laser welding, the optical fiber being disposed such that the laser light transmitted by the optical fiber has an optical axis that crosses an axis of the arc electrode at a predetermined angle;
    a collimating optical system for rendering the laser light from the optical fiber parallel and outputting the parallel laser light;
    a first reflecting mirror for reflecting a part of the parallel laser light, from the collimating optical system, at the predetermined angle with respect to an optical axis of the parallel laser light, thereby splitting the parallel laser light into a first split laser light as the reflected part of the parallel laser light and a second split laser light as a part of the parallel laser light that has not been reflected by the first reflecting mirror;
    a second reflecting mirror for reflecting the second split laser light, which has not been reflected by the first reflecting mirror, at the predetermined angle with respect to the optical axis of the parallel laser light such that a space is formed between the first split laser light and the second split laser light; and
    a focusing optical system for focusing the first split laser light, which has been reflected by the first reflecting mirror, and the second split laser light, which has been reflected by the second reflecting mirror, on the base material,
    wherein the arc electrode is disposed in the space to be closer to the base material than to the focusing optical system.

2. The laser-arc hybrid welding head according to claim 1, further comprising:
    a mirror adjusting portion for pivoting the second reflecting mirror to adjust a reflecting angle of the second reflecting mirror.

* * * * *